(12) United States Patent
Rayner

(10) Patent No.: US 7,830,806 B2
(45) Date of Patent: Nov. 9, 2010

(54) MONITORING A NETWORK PATH

(75) Inventor: Andrew Rayner, Suffolk (GB)

(73) Assignee: British Telecommunications plc, London (GB)

( * ) Notice: Subject to any disclaimer, the term of this patent is extended or adjusted under 35 U.S.C. 154(b) by 1193 days.

(21) Appl. No.: 10/571,062

(22) PCT Filed: Sep. 2, 2004

(86) PCT No.: PCT/GB2004/003781

§ 371 (c)(1),
(2), (4) Date: Mar. 8, 2006

(87) PCT Pub. No.: WO2005/027415

PCT Pub. Date: Mar. 24, 2005

(65) Prior Publication Data

US 2007/0030810 A1    Feb. 8, 2007

(30) Foreign Application Priority Data

Sep. 11, 2003    (GB)    ............................... 0321342.8

(51) Int. Cl.
H04L 12/26    (2006.01)
(52) U.S. Cl. .................. 370/242; 370/216; 370/228; 370/238; 370/241; 709/224
(58) Field of Classification Search .............. 370/242, 370/216, 228, 238, 241; 709/224

See application file for complete search history.

(56) References Cited

U.S. PATENT DOCUMENTS

| 5,241,534 A | * | 8/1993 | Omuro et al. | 370/218 |
| 6,064,654 A | * | 5/2000 | White-Hauser | 370/248 |
| 6,580,690 B1 | * | 6/2003 | Damien | 370/228 |
| 2002/0071391 A1 | | 6/2002 | Ishioka | |
| 2007/0127392 A1 | * | 6/2007 | Dispensa | 370/252 |

FOREIGN PATENT DOCUMENTS

| GB | 2303996 A | 3/1997 |
| GB | 2380634 A | 8/2002 |

OTHER PUBLICATIONS

International Search Report.
International Search Report dated Dec. 13, 2004.
GB Search Report dated Nov. 11, 2003.

* cited by examiner

*Primary Examiner*—Ricky Ngo
*Assistant Examiner*—Luat Phung
(74) *Attorney, Agent, or Firm*—Nixon & Vanderhye PC

(57) ABSTRACT

The present invention relates to the monitoring of paths along which signals are carried in a telecommunications network, in particular to determine if a path has been altered. Each path has a transit time associated therewith for data transport along that path. The method comprises the steps of: monitoring the difference between the transit time of a first signal path and the transit time of a second signal path, such that a change in the difference between the transit times of the two paths can be detected; and, in dependence at least in part on any such detected change, generating an alarm signal. The alarm signal can be used to indicate to a customer that one of the paths has been re-routed.

21 Claims, 2 Drawing Sheets

MONITORING A NETWORK PATH

This application is the US national phase of international application PCT/GB2004/003781 filed 2 Sep. 2004 which designated the U.S. and claims benefit of GB 0321342.8, dated 11 Sep. 2003, the entire content of which is hereby incorporated by reference.

FIELD OF TECHNOLOGY

The present invention relates to the monitoring of paths along which signals are carried in a telecommunications network, in particular to determine if a path has been altered.

BACKGROUND

It is known for a network operator to provide a customer with two paths over which the customer's content data can be transmitted. Thus, if one path is interrupted or inadvertently broken, content can still be received by the customer's intended recipient over the other path. It is preferable for the two paths to be "diverse", such that the paths follow a different geographical route. This reduces the risk that the paths will be interrupted together. However, a network operator may re-route one or both of the paths without the customer necessarily being aware. Such a change in path can easily be accomplished by a network operator, for example by dynamically re-configuring the routers along a path such that data is sent over different links.

SUMMARY

According to one aspect of the invention, there is provided a method of determining if one or more of at least two signal paths has been altered, each path having a transit time associated therewith for data transport along that path, the method comprising the steps of: monitoring the difference between the transit time of a first signal path and the transit time of a second signal path such that a change in the difference between the transit times of the two paths can be detected; and, in dependence at least in part on any such detected change, generating an alarm signal.

A change in the transit time of one of the paths is likely to indicate that the path has been re-routed, since re-routing will normally affect the length of a path. Likewise, other alterations to a path such as the substitution of one transport medium such as optical fibre with another transport medium such as copper is likely to also affect the transit time. Thus, the alarm signal can be used to notify a customer of the likely alteration to a path. It can be important for a customer to be alerted to a change in path for several reasons. For example, the new path may include a link or other equipment which is known to be particularly vulnerable to faults or damage. Alternatively, as a result of re-routing, paths which were originally diverse may coincide over at least part of their lengths. Paths may coincide where the first and second signal streams are carried over the same data link, for example the same optical fibre, or where the first and second signal streams are carried by different fibres, cables or other links located within the same duct. However, in a region where the paths coincide, any interruption in that region is likely to affect both paths, which can be undesirable.

Because the difference in the transit times between the paths is monitored, a customer may not know which of his paths has been altered. However, it is easier to measure a difference in transit times than it is to measure the actual transit time of a path.

The two paths may each extend between a common upstream location and a common downstream location so as to provide a fault tolerant system for transmitting content between the two locations. Only one path at a time may be used for transmitting the content, but preferably each path will be used concurrently to carry data representative of the same content. The data on each path will preferably be representative of the content to the same level of quality, but alternatively to conserve bandwidth, one path may be used as a reserve path, carrying data representative of the content to a lower level of quality than that of the other path. Alternatively, the reserve path may carry a subset of the data carried by the main path. The content carried by the paths will preferably be video content, it being important for such content to be transmitted in a fault-tolerant manner, the percentage down-time normally expected for transmission of such data being as low as 0.02%. However, the content may be other data such as audio data which can require delivery with a very low downtime.

To determine the difference in the transit times associated with the paths, marker signals may be introduced into each of the paths. Preferably, the marker signals will be dispersed between the content data carried by the paths. If the content data is carried as a stream of packets, the marker signals may be introduced into empty packets located within the streams.

The marker signals will preferably be introduced into the respective paths such that for each marker introduced into one path, a corresponding marker is introduced into the other path. In this case, the difference in the transit times of corresponding markers, and hence the difference in transit time associated with each path, can be monitored.

The markers may contain correspondence information indicating which pairs of markers correspond to one another, to make it easier for the transit time of corresponding markers to be determined. However, correspondence information may not be required if corresponding markers are introduced into each path substantially simultaneously and with sufficiently long time intervals between respective pairs of markers.

The marker signals may each include a time stamp. The respective time stamps of markers may indicate the time difference between the launch of corresponding markers onto each path, possibly with correspondence information which can be used at the downstream location to determine which markers correspond to one another. However, in a preferred embodiment, a common clock source will be provided at the upstream location such that each marker can include a time stamp indicative of its time of departure relative to a common time reference at the upstream location.

Preferably, the arrival times of markers at the downstream location will be monitored. The difference in the arrival times may then be used directly or indirectly to monitor the difference in the transit times of markers travelling along the two paths.

A common clock source may be provided at the downstream location for monitoring the arrival times of markers from each of the paths relative to a common reference. The common clock source at the downstream location may be formed from a single clock or counter. Likewise, the common clock source at the upstream location may be formed by another clock or counter. Alternatively, one or each of the clock sources may (each respectively) be formed by a pair of clocks, one for each path, provided that the clocks within each pair can be operated such that they do not drift excessively relative to one another.

However, it will be appreciated that on the one hand it may be important to know the relative time of departure of markers on the first path as measured relative to that of markers on the second path, and that on the other hand it may be important to know the relative time at which marker signals arrive along one path at the downstream location as measured relative to the time at which marker signals arrive along the other path at the downstream location. Therefore, an upstream clock source may be used which is not necessarily synchronised to the downstream clock source, and vice-versa. It will be particularly advantageous to be able use respective clock sources at the upstream and downstream locations that are independent from one another, since when the two locations are separated by a long distance, for example at least 10 km or 100 km, such distances can make it difficult to synchronise the upstream and downstream clock sources.

Preferably, markers will be introduced onto a network at a sending station, which sending station will receive content data from a customer for onward transmission onto the network. Likewise, the marker signals will preferably be received at a receiving station, where the difference in transit times between the markers on each path will be evaluated. The sending station and the receiving station will preferably each be releaseably connectable to a network. Once a network operator has agreed to provide duplicate paths for a customer, the customer can have the sending station and the receiving station installed at the locations where the paths respectively begin and end, so as to monitor the paths. Preferably, a marker signal in one stream will include an indication of the time at which that marker signal was introduced relative to the time at which a marker was introduced into the other stream. That is, the markers can be introduced in pairs, one marker of a pair in one path, the other marker of the pair in the other path. One marker from each pair will then preferably have an indication of the time difference between the time of insertion of the two markers of a pair, which time difference can be taken into account when monitoring the difference in transit times.

Since the difference in transit times can be monitored at the downstream location, there is provided, according to another aspect of the invention, a receiving station which is connectable to a plurality of paths, each path having a transit time associated therewith for data transport along that path, the network station having means for: monitoring the difference between the transit time of a first path and the transit time of a second path such that a change in the difference between the transit times of the two paths can be detected; and, in dependence at least in part on any such detected change, generating an alarm signal. Further aspects of the invention are specified in the appended claims.

BRIEF DESCRIPTION OF DRAWINGS

The invention will now be further described by way of example, with reference to the following drawings in which.

DETAILED DESCRIPTION

Figure 1:
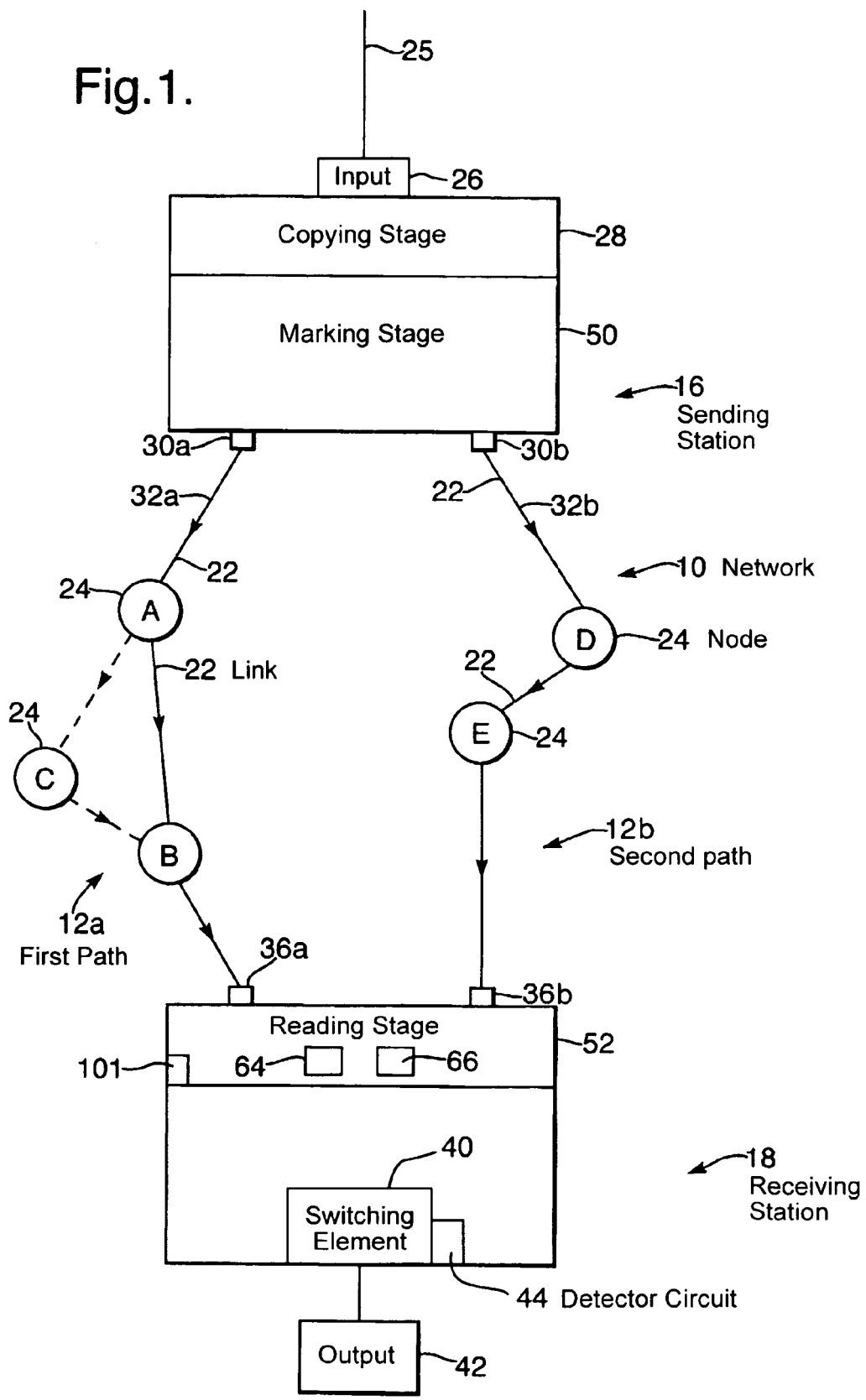
FIG. 1 shows apparatus for determining if a path through a network portion has been altered according to the present invention.

In FIG. 1, there is shown a network 10 which is configured to provide a first path 12a and a second path 12b, each of which connects a sending station 16 to a receiving station 18. Each path 12a, 12b includes a plurality of links 22 formed for example by optical fibre, which links are connected by a plurality of nodes or routers 24 (the network 10 will normally include further links and routers which in this example are not shown). The first and second paths 12a, 12b respectively originate at a first network input 30a and a second network input 30b, which inputs 30a, 30b are connected to the sending station 16 to allow the sending station to send data over the paths 12a, 12b. Likewise, the paths 12a, 12b respectively terminate at first and second network outputs 36a, 36b, which outputs are connected to the receiving station 18 to allow data sent over the paths to be received by the receiving station 18. The paths are arranged such that data travelling along one path does not share a link (nor, preferably, a router) with data travelling along the other path. This arrangement reduces the risk that a fault will cause both paths to fail at the same time.

A customer wishing to send content 25 such as video or audio over the network 10 will provide the data at an input 26 of the sending station. The sending station 16 has a copying stage 28 which copies the content from the customer, the content being passed to the first input 30a of the network as a first stream of data 32a for transmission over the first path 12a, whilst the same content is passed to the second input 30b of the network as a second stream of data 30b, for transmission over the second path 12b. (Alternatively, the customer may provide the duplicate signal streams, in which case the copying stage will not be required). The first and second streams of data are respectively received by the receiving station 18. The receiving station has a switching element 40 for selectively connecting one of the two paths 12a, 12b to an output 42 of the receiving station 18, such that the signal stream from the connected path can be passed to the customer's intended recipient. The signal stream received from the other path is normally redundant when both paths are operational. However, if a fault is detected in the connected path by a detector circuit 44 coupled to the switching element 40, the detector circuit generates a fault signal which causes the switching element 40 to selectively connect the output 42 of the receiving station 18 to the other (previously redundant) path. In this way, the content data input at the receiving station 18 can continue to be received at the receiving station output 42 even if one of the two paths experiences a fault.

It is possible for the network operator responsible for the network 10 to re-route one or both of the paths 12a, 12b. For example, the link connecting nodes A and B in the first path 12a may become faulty, in which case the first path 12a can be re-routed through an intermediate node such as node C, using links (shown in dotted lines) previously unused in the first path. Alternatively, the first path may be re-routed as indicated in FIG. 2, such that the link between nodes D and E previously used only by the second path is now used by both paths, such that data from the first and second streams 32a, 32b travel over a common link.

To determine whether one or both of the paths 12a, 12b has been re-routed, the sending station 16 is provided with a marking stage 50 to introduce markers into each of the datastreams 32a, 32b. For each marker introduced into one stream, a corresponding marker is introduced into the other stream; that is, the markers are introduced in pairs, a marker from each pair being introduced into each respective path (if there are more than two paths, for example three paths, markers can be introduced in triplets). The markers contain correspondence information which can be read by a reading stage 52 in the receiving station 18, so that the reading stage can determine which markers correspond to one another in the respective streams. The reading stage 52 is configured to compare the arrival time of a marker in one stream with the arrival time of the corresponding positioned marker in the other stream, and using the difference in the arrival times, determine the difference in the transit times of correspondingly positioned markers travelling between the sending and receiving stations in the respective first and second streams.

Figure 2:
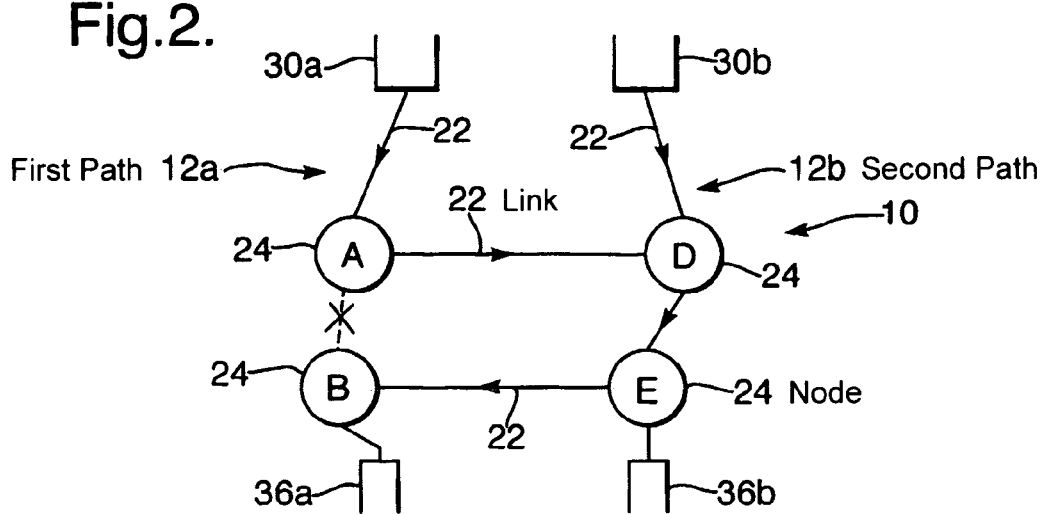
FIG. 2 shows the network portion of FIG. 1 but where one of the paths has been altered; and, FIG. 3 shows a more detailed view of a sending station shown in FIG. 1.

If one of the paths has changed, as indicated for example in FIG. 2, this will cause the markers travelling along the re-routed path to arrive at the receiving station at a different time to that at which the markers would have arrived had the path not been changed. Since the other of the two paths (the second path 12b in FIG. 2) has not changed, the difference in the transit time of corresponding markers will change. If the difference in the transit times of corresponding markers exceeds a threshold value, the reading stage is configured to generate an alarm signal to alert the customer that a path may have changed. Clearly, if a path is re-routed in such a way that the path length does not change, the transit time of markers in that path is likely to remain the same, in which case no alarm signal will be generated. Likewise, if both paths are lengthened by the same amount, an alarm signal is unlikely to be generated.

The threshold value beyond which an alarm is generated will preferably be chosen in dependence on the fluctuations (either expected or measured) in the difference in transit times of corresponding markers in the two paths when the paths do not change. Typically, the threshold will be set to +/−100 micro seconds. This compares with a typical difference in the transit times of a few ms, for example 3 ms where two paths over optical fibre differ in length by 600 km.

If pairs of corresponding markers can each be introduced in a respective stream substantially simultaneously (that is, such that the time difference is smaller that the smallest expected change in transit time that is likely to result from a change in path routing), it can be inferred that a path has changed simply on the basis of a change in the difference in the arrival times of corresponding markers. However, in practical situations, there is likely to be a significant offset in the times at which corresponding markers can be introduced in the respective streams. In such a situation, one or each of a pair of correspondingly positioned markers will contain information (introduced in the markers by the sending station) which can be used by the reading stage 52 of the receiving station 18 to determine the difference in the times at which corresponding markers were introduced into their respective streams.

Figure 3:
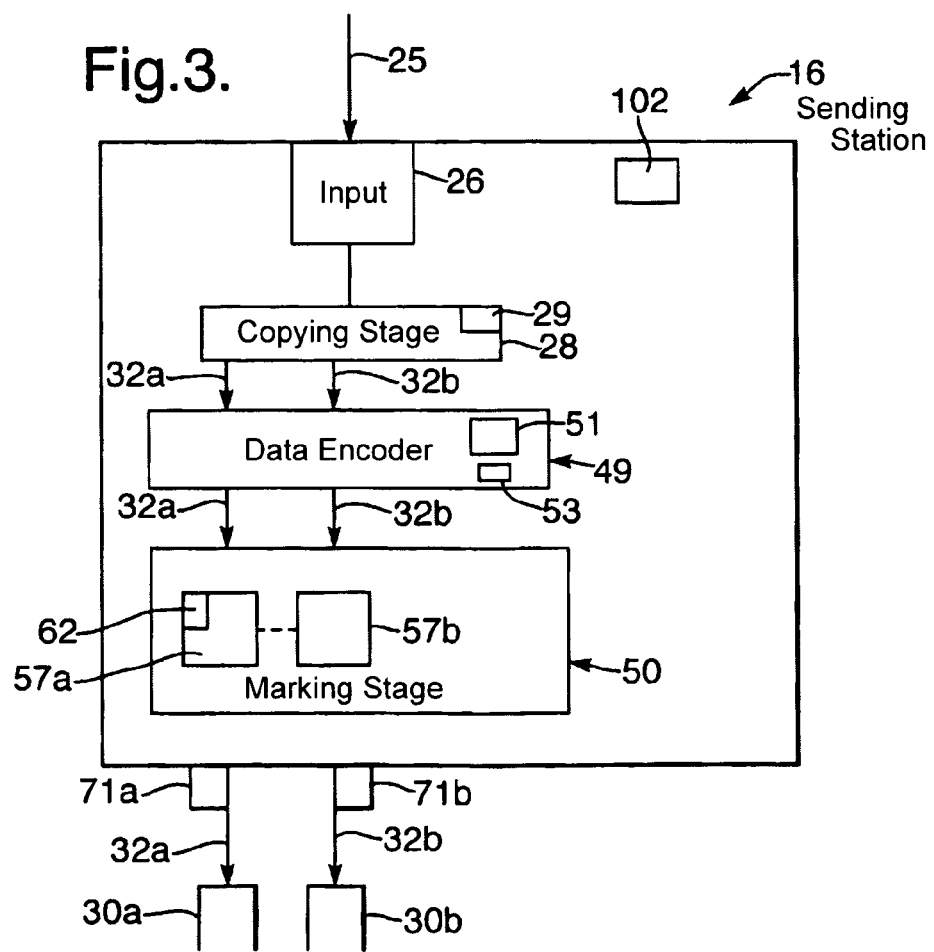

FIG. 3 shows a more detailed view of a sending station 16 such as that of FIG. 1, which in this example is arranged to send video signals over the network 10 (like components have been given the same numerals). In use, a customer's content data 25 (here video data) is introduced at the input 26 of the receiving station in digital form and passed to the copying stage 28 (alternatively, the copying stage 28 may include an analogue to digital converter 29, in which case the customer's content data will be entered at the input 26 in analogue form). The copying stage 28 provides a first stream of digital data 32a and a second stream of digital data 32b. To allow the sending station 16 to transmit video signals efficiently, the sending station includes a data encoder 49 for compressing and packetising the first and second datastream 32a, 32b from the copying stage. An encoding stage 51 is provided which encodes the incoming datastreams according to the MPEG standard, and a packetising stage 53 is provided to packetise the data according to the ASI standard (other standards such as Asynchronous Transfer Mode (ATM) could be employed instead).

After being encoded and packetised, the signal streams 32a, 32b are passed to the marking stage 50. The marking stage 50 includes a master marker stage 57a for inserting stamps or other markers into the first signal stream 32a, whilst a slave marker stage 57b is provided for inserting markers or stamps into the second stream 32b. The marker stage 57a has a free running counter or "clock" such as a Relative Time Stamp counter 62 which is set to generate a flag signal at regular time intervals, in this example every second. The master and slave marker stages 57a, 57b are coupled, such that each flag signal generated by the master maker stage 57a is passed to the slave marker stage 57b. Each marker stage 57a, 57b is configured to detect in the signal stream the presence of "null" packets whose payload is empty. In response to a flag signal, the master marker stage 57a is configured to insert a stamp into the first available null packet present in the first stream. Likewise, the slave marker stage 57b is configured to introduce a corresponding stamp into the second signal stream in response to the flag signal. Packets of encoded video data with marked packets dispersed therebetween are output at first and second outputs 71a, 71b, which outputs are releasably connected to the first and second network inputs 30a, 30b.

Because it is unlikely that a null packet will be available in each stream simultaneously, stamps are likely be inserted into the two signal streams at different times in response to a given flag signal. So that this offset can be accounted for by the receiving station 18, the master marker stage 57a is configured to read the value of the RTS counter 62 at the moment when the master marker stage 57a is about to introduce a stamp into a null packet of the first signal stream 32a, such that the stamp contains the RTS counter value or "time" at which the stamp was introduced, rather than the time at which the flag signal was generated. Likewise the slave marker stage 57b reads the RTS counter value 62 such that when inserting a stamp, it inserts the actual RTS counter value at the time of insertion, such that any offset in the insertion times for the two streams can be calculated from the respective RTS values.

Returning to FIG. 1, the reading stage 52 of the receiving station 18 is provided with a clock stage 64 for recording the time at which marked packets are received. A processing stage 66 is provided for determining the difference in the transit times between marked packets that have travelled along the first path and the transit time of packets that have travelled along the second path. Thus, if S1 is the "time" at which a previously null packet in the first stream is marked or stamped, A2 is the time at which that packet is received at the receiving station 18, and likewise S2 and A2 are the times at which a corresponding packet is stamped and received respectively in the second stream, then the processing stage calculates respective values for (S1-S2) and (A1-A2). The processing stage 66 then calculates the difference between the respective values for (S1-S2) and (A1-A2). In this way, the processing stage simply determines the difference in arrival time (A1-A2), taking into account any offset (S1-S2) in the time at which stamps are introduced into marked packets. Clearly, if respective marked packets can be introduced into each stream with a sufficiently small time separation, then (S1-S2) can be neglected, and only the difference in arrival times (A1-A2) need be considered.

The processing stage 66 will be configured to: determine the difference D between the transit times along the two paths: i.e. to determine the value D=|(A1−A2)−(S1−S2)|=|(A1−S1)−(A2−S2)| for corresponding markers (vertical bars indicating the modulus of the quantity between the bars); to determine if D exceeds a threshold value; and, if D exceeds the threshold value for a predetermined number of consecutive pairs of corresponding markers, to generate an alarm signal. Alternatively, the processor stage 66 may be configured to determine the average value for D over a period of time, and to generate an alarm signal if the average exceeds a threshold.

The processing stage 66 is configured to determine the difference between the transit times of corresponding markers along the two paths by using the difference in arrival times A1, A2 of the markers. The difference in arrival time can be used directly, in which case the quantity (A1−A2) is evaluated, and a correction due to any offset in the departure times (S1−S2) of a pair of markers is made. Alternatively, the difference in arrival time can be used indirectly, in which case a first quantity (A1−S1) and a second quantity (A2−S2) are each evaluated, following which the difference between first and second quantities obtained. Clearly, in each case is the difference between the arrival times along the two paths that is important, in particular if (S1−S2) is a small correction to the value (A1−A2).

At least one processor 101 is provided at the receiving station on which computer algorithms such as the reading stage, including the processor stage and/or the clock stage can be run in use. Likewise, at least one processor 102 is provided at the sending station on which some or all of software stages for copying, a/d conversion, marking, encoding, and the RTS counter can be run.

Clearly, the invention provides a simple way for the customer of a network operator to find out if paths the customer has been allocated have been altered, in particular where the start and end points of the paths are located sufficiently far away for clocks at the start and end locations of the paths to be synchronised.

The invention claimed is:

1. A method of determining whether one or more of at least two signal paths has been altered, the paths each having a transit time associated therewith, the method comprising:
   monitoring the difference between the transit time of a first signal path and the transit time of a second signal path such that a change in the difference between the transit times of the two paths is detected;
   comparing the detected change in difference against a threshold value; and
   in dependence at least in part on any such detected change exceeding the threshold value, generating an alarm signal.

2. A method as claimed in claim 1, wherein the difference between the transit times of the paths is monitored by: introducing marker signals onto the first and second paths at respective entry points; receiving the marker signals at respective collection points along the first and second paths; and, monitoring the arrival times of the marker signals in one path relative to the arrival times of marker signals in the other path.

3. A method as claimed in claim 2, wherein for each marker signal introduced onto one path, a corresponding marker signal is introduced onto the other path, and wherein the difference in the arrival times of corresponding marked signal is used to monitor the difference in the respective transit times associated with the first and second paths.

4. A method as claimed in claim 3, wherein the difference in the time of arrival of marker signals is monitored.

5. A method as claimed in claim 2, including the step of introducing into each marker signal an indication of the relative time at which that marker signal was introduced onto a path, the relative time being measured relative to a clock source.

6. A method as claimed in claim 2, wherein a marker signal in one path includes an indication of the time at which that marker signal was introduced relative to the time at which a marker was introduced into the other path.

7. A method as claimed in claim 1, wherein the first and second paths extend between a common upstream location and a common downstream location.

8. A method as claimed in claim 6, wherein the first and second paths extend between a common upstream location and a common downstream location and wherein the common upstream clock source is provided at the upstream location.

9. A method as claimed in claim 1, wherein each path carries a respective signal stream, the signal stream carried by the first path being representative of the same content as the signal carried by the second path.

10. A method as claimed in claim 7, wherein the relative time of arrival of marker signals is measured relative to a common downstream clock source located at the downstream location.

11. A method as claimed in claim 1, wherein the difference between the transit times of the two paths is determined by receiving marker signals from respective entry points on the first and second paths, and monitoring the arrival times of the marker signals.

12. A method as claimed in claim 11, wherein each marker signal includes a time stamp indicative of the time at which that marker signal was introduced onto a path relative to a clock source, the method including the further step of reading the time stamps and taking into account the time difference between the time at which packets have been introduced onto the first and second paths when determining the difference in the transit times of the two paths.

13. A method as claimed in claim 1, wherein each path carries video data.

14. A receiving station for receiving data from a sending station sent over at least a first path and a second path, the paths each carrying respective marker signals, the receiving station comprising:
   a reading stage for detecting the presence of marker signals, and for monitoring the time of arrival of marker signals from one path relative to the time of arrival of marker signals from the other path, and
   a processing stage for determining, in dependence at least in part on the monitored arrival times, the difference in transit times between marker signals travelling along the first path and the transit time of marker signals travelling along the second path, an alarm signal being generated if a change in the difference between the transit times along the first and second paths exceeds a threshold value.

15. A receiving station as claimed in claim 14, wherein the processing stage is configured to perform the following:
   (i) calculate the difference between the transit time of a marker on one path and the transit time of another marker on the other path;
   (ii) repeat step (i) for each pair of subsequently received markers; and
   (iii) if a change in the difference in transit time associated with received pairs of markers reaches the threshold value, generate the alarm signal.

16. A receiving station as claimed in claim 15, wherein an alarm signal is generated only if the threshold value has been reached a predetermined number of times within a time period.

17. A receiving station as claimed in claim 14, the receiving and sending stations being connectable to the network, the sending station being configured, when connected to the network to: send data on a plurality of paths, the data including marker signals, each marker signal including a respective time stamp, the time stamp of a marker signal being indicative of the relative time at which that marker signal was transmitted.

18. A receiving station as claimed in claim 17, wherein the sending station includes a common clock source, the indication of a relative time included in each stamp being a time measured relative to the common clock source.

19. A receiving station as claimed in claim 17 wherein the sending station and the receiving station are separated by a distance of more than 10 km.

20. A receiving station as claimed in claim 19, wherein the distance separating the sending station and the receiving station is at least 100 km.

21. A receiving station which is connectable to a plurality of paths, each path having a transit time associated therewith for data transport along that path, the receiving station comprising:
- means for monitoring the difference between the transit time of a first path and the transit time of a second path such that a change in the difference between the transit times of the two paths is detected;
- means for comparing the detected change in difference against a threshold value; and
- in dependence at least in part on any such detected change exceeding the threshold value, means for generating an alarm signal.

* * * * *